United States Patent
Kangas et al.

(10) Patent No.: US 12,393,542 B2
(45) Date of Patent: Aug. 19, 2025

(54) EXPANSION CARD ADAPTATION

(71) Applicant: Lenovo (Singapore) Pte. Ltd., New Tech Park (SG)

(72) Inventors: P. Daniel Kangas, Raleigh, NC (US); James Michael Dupuy, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 43 days.

(21) Appl. No.: 18/323,354

(22) Filed: May 24, 2023

(65) Prior Publication Data

US 2024/0394208 A1    Nov. 28, 2024

(51) Int. Cl.
   *G06F 13/40*    (2006.01)
   *G06F 1/18*     (2006.01)
   *G06F 11/32*    (2006.01)
   *G06F 13/42*    (2006.01)

(52) U.S. Cl.
   CPC .......... *G06F 13/4081* (2013.01); *G06F 1/183* (2013.01); *G06F 11/325* (2013.01); *G06F 13/4282* (2013.01)

(58) Field of Classification Search
   CPC .. G06F 13/4081; G06F 13/4282; G06F 1/183; G06F 11/325
   See application file for complete search history.

(56) References Cited

U.S. PATENT DOCUMENTS

| | | | |
|---|---|---|---|
| 2,022,008 A * | 11/1935 | Price | E04H 12/2261 52/292 |
| 10,359,815 B1 * | 7/2019 | Lin | H01R 12/721 |
| 10,762,025 B1 * | 9/2020 | Tsorng | G06F 13/4081 |
| 10,820,415 B1 * | 10/2020 | Stenfort | G06F 13/385 |
| 10,956,353 B1 * | 3/2021 | Bailey | G06F 13/4068 |
| 10,976,785 B1 * | 4/2021 | St. Germain | H05K 7/1409 |
| 11,596,073 B2 * | 2/2023 | Zhang | G06F 1/187 |
| 2015/0277935 A1 * | 10/2015 | Desimone | G06F 13/382 710/313 |
| 2022/0342463 A1 * | 10/2022 | Norton | G06F 1/187 |
| 2024/0107671 A1 * | 3/2024 | Heyd | G06F 1/20 |
| 2024/0204433 A1 * | 6/2024 | Chen | H01R 12/716 |
| 2024/0288915 A1 * | 8/2024 | Grady | G06F 1/187 |

* cited by examiner

*Primary Examiner* — Henry Tsai
*Assistant Examiner* — Christopher A Daley
(74) *Attorney, Agent, or Firm* — Kunzler Bean & Adamson

(57) ABSTRACT

An apparatus, system, and method for emulating a computer expansion card. The apparatus includes an edge connector comprising a plurality of pin fingers, the edge connector conforming with a first connector type and a socket connector configured to receive a computer expansion card conforming with a second connector type. The apparatus further includes a PCB comprising a logic adapter configured to convert a first set of signals associated with the first connector type into a second set of signals associated with the second connector type.

20 Claims, 7 Drawing Sheets

EXPANSION CARD ADAPTATION

FIELD

The subject matter disclosed herein relates to computer expansion cards and more particularly relates to emulating a computer expansion card.

BACKGROUND

M.2 solid state storage devices are popular and relatively low-cost. However, M.2 solid state storage devices lack useful features of newer technology drives, such as supporting removal of the device while the system unit is power on, a characteristic referred to as "hot swappable."

BRIEF SUMMARY

Disclosed are procedures for emulating a computer expansion card. Said procedures may be implemented by apparatus, systems, methods, or computer program products.

According to one aspect, an apparatus that supports techniques for emulating a computer expansion card includes an edge connector comprising a plurality of pin fingers, the edge connector conforming with a first connector type and a socket connector configured to receive a computer expansion card conforming with a second connector type. The apparatus includes a printed circuit board ("PCB") comprising a logic adapter configured to convert a first set of signals associated with the first connector type into a second set of signals associated with the second connector type.

According to another aspect, a system that supports techniques for emulating a computer expansion card includes an enclosure dimensioned to conform to a first form factor, a computer expansion card located within the enclosure, and a bridge card coupled to the computer expansion card and located within the enclosure. In various embodiments, the bridge card includes i) an edge connector including a plurality of pin fingers, the edge connector conforming with a first connector type; ii) a socket connector configured to receive the computer expansion card, the socket connector conforming with a second connector type; and iii) a PCB including a logic adapter configured to convert a first set of signals associated with the first connector type into a second set of signals associated with the second connector type.

According to a third aspect, a method for emulating a computer expansion card includes engaging a computer expansion card with a first socket connector conforming with a first connector type and engaging an edge connector with a second socket connector conforming with a second connector type. The first method includes transforming a first set of signals associated with the first connector type into a second set of signals associated with the second connector type.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
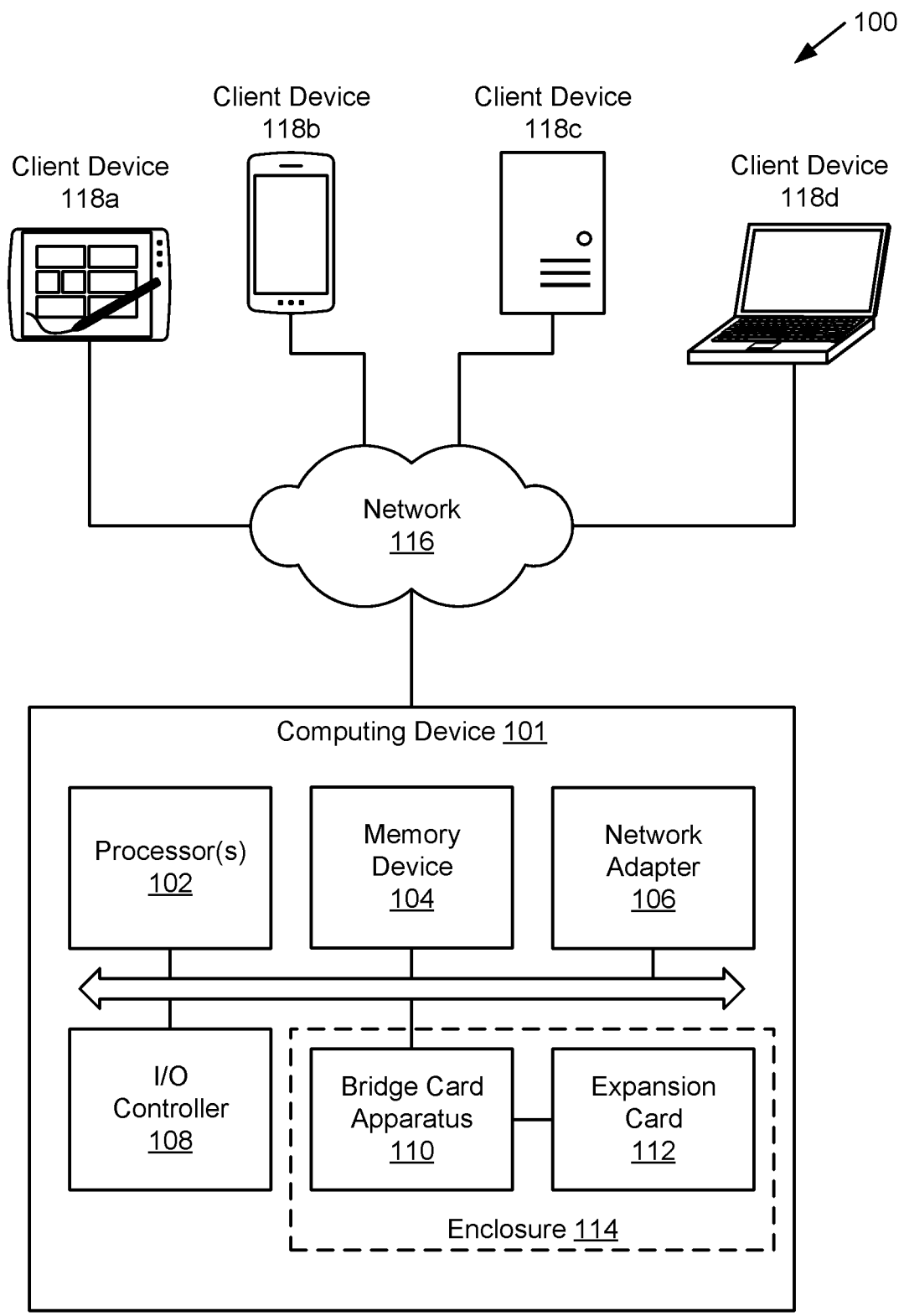
FIG. 1 is a block diagram illustrating one embodiment of a system that supports techniques for emulating a computer expansion card in accordance with aspects of the present disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable logic array ("PLA"), programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), an electrically erasable programmable read-only memory ("EEPROM") (also referred to as Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to flowchart illustrations and/or block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code or computer readable program instructions.

The code (e.g., computer readable program instructions) may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The code (e.g., computer readable program instructions) may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The code (e.g., computer readable program instructions) may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes apparatuses, systems, and methods that support techniques for emulating a computer expansion card. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

When a new generation of computer expansion cards, such as solid state drives, hits the market, the new products generally have new and/or improved features, while the older generation is generally more available (i.e., more plentiful) and less expensive. Regarding solid state storage devices, such as those used in data centers, the M.2 devices are still popular with many low cost modules available even as the new flash form factor E1.S is becoming pervasive.

These common M.2 solid state storage devices are not hot swappable, that is they are not removable while the system unit is powered on. However, it is beneficial for a system administrator or technician to be able to remove a solid state storage device, e.g., in case of device failure or for physical security. Newer technologies, such as E1.S flash drives are designed to be hot swappable, thereby allowing a storage device to be removed and replaced without requiring the system unit to power down first.

To benefit from the abundance of low cost M.2 solid state storage devices (also referred to as a "M.2 modules"), the present disclosure provides solutions for emulating an E1.S device with an M.2 flash drive and a bridge card that emulates the E1.S interface (both electrically and mechanically). Beneficially, the bridge card allows plugging an M.2 module into an E1.S slot connector and making the M.2 module hot swappable.

To allow an M.2 module to emulate an E1.S drive, the proposed solutions provide a PCB and electrical circuits to emulate the E1.S interface both electrically (i.e., by adapting the signaling) and mechanically (i.e., with compatible connectors).

E1.S is a relatively new flash form factor defined under the Enterprise and Datacenter Standard Form Factor ("EDSFF") specifications. The E1.S form factors are becoming pervasive for high capacity and hot swappable non-volatile memory express ("NVME") storage. The form factors included in the EDSFF specification are the E1.S (short) and the E1.L (long). The EDSFF specifications define the physical dimensions, mechanical connectors, and electrical interfaces that an E1.S device is to have, to ensure compatibility among different hardware providers. The E1.S standard is meant to replace previous generation solid state storage device form factors, such as the M.2 standard. While M.2 devices are popular today, it is expected that the industry will shift quickly to the new E1.S form factors.

The EDSFF specifications define five thicknesses for the E1.S form factor, with the thinnest form factor being substantially similar to the width of a standard M.2 drive. The thicket E1.S form factors allow for the addition of heat sinks/heat spreaders to increase the thermal headroom of the device (thereby allowing for increased power and performance). When compared to the M.2 form factor, the E1.S form factors are longer and wider. The inventors have recognized that a M.2 module can fit within the footprint of an E1.S drive.

An E1.S device is designed to be hot swappable; however, M.2 NVME solid state drives ("SSDs") are also not hot-swappable because the M.2 connector was not made for hot swapping. The M.2 form factor and interface are defined by the Peripheral Component Interconnect Special Interest Group ("PCI-SIG"). While M.2 modules have been popular in data centers, M.2 modules have challenges in hotplug/serviceability and overheating. A M.2 edge connector is not compatible with an E1.S socket connector (also referred to as a slot connector), nor is an E1.S edge connector compatible with an M.2 socket connector. Therefore, an M.2 device cannot be plugged into an E1.S slot. Further, the signaling interfaces are different between the E1.S and M.2 specifications.

An apparatus, a system, and a method that support techniques for emulating a computer expansion card are disclosed. According to one aspect of the disclosure, the apparatus may include A) an edge connector comprising a plurality of pin fingers, the edge connector conforming with a first connector type; B) a socket connector configured to receive a computer expansion card conforming with a second connector type; and C) a PCB comprising a logic adapter configured to convert a first set of signals associated with the first connector type into a second set of signals associated with the second connector type.

In some embodiments, the first connector type comprises an E1.S edge connector, and wherein the second connector type comprises an M.2 socket connector. In some embodiments, the edge connector has a 2C connector size and comprises a notch separating the first set of the plurality of pin fingers from the remainder of the plurality of pin fingers. In other embodiments, the edge connector may have a 1C connector size.

In various embodiments, a subset of the plurality of pin fingers has an extended finger length compared to the remainder of the plurality of pin fingers. In such embodiments, the subset of the plurality of pin fingers corresponding to ground pins.

In some embodiments, the PCB supports a first superset of signals via the edge connector and supports a second superset of signals via the socket connector. In such embodiments, the first superset of signals comprises the first set of signals and a third set of signals, and the second superset of signals comprises the second set of signals and the third set of signals. In various embodiments, the PCB bridges the third set of signals between the edge connector and the socket connector.

In some embodiments, the PCB comprises an amber light-emitting diode ("LED") and a blue LED. In such embodiments, the logic adapter may be configured to A) receive an electrical signal from a particular pin of the edge connector and B) convert the electrical signal into user information presentable to a user via the amber LED and the blue LED. In certain embodiments, the user information comprises failure information and location information.

In some embodiments, the PCB comprises a green LED. In such embodiments, the logic adapter may be configured to A) receive an electrical signal from a particular pin of the edge connector, B) pass the electrical signal to a corresponding pin of the socket connector, and C) convert the electrical signal into state information presentable to a user via the green LED. In certain embodiments, the state information comprises a power state of the computer expansion card and host-initiated input/output ("I/O") activity state of the computer expansion card.

In some embodiments, the logic adapter comprises a serializer I/O expander configured to multiplex a plurality of digital inputs into a plurality of bits. In certain embodiments, the serializer I/O expander comprises a serial general purpose input/output ("SGPIO") interface. In certain embodiments, the plurality of digital inputs comprises a power loss indication signal and a power loss acknowledgement ("ACK") signal.

According to another aspect of the invention, a system may include A) an enclosure dimensioned to conform to a first form factor, B) a computer expansion card located within the enclosure, and C) a bridge card coupled to the computer expansion card and located within the enclosure. In various embodiments, the bridge card includes i) an edge connector including a plurality of pin fingers, the edge connector conforming with a first connector type; ii) a socket connector configured to receive the computer expansion card, the socket connector conforming with a second connector type; and iii) a PCB including a logic adapter configured to convert a first set of signals associated with the first connector type into a second set of signals associated with the second connector type.

In some embodiments, the computer expansion card conforms to a second form factor smaller than the first form factor, where the first form factor comprises an E1.S form factor and the second form factor comprises an M.2 form factor. In some embodiments, the first connector type comprises an E1.S edge connector and the second connector type comprises an M.2 socket connector.

In some embodiments, the edge connector has a 2C connector size and comprises a notch separating the first set of the plurality of pin fingers from the remainder of the plurality of pin fingers. In other embodiments, the edge connector may have a 1C connector size.

In various embodiments, a subset of the plurality of pin fingers has an extended finger length compared to the remainder of the plurality of pin fingers. In such embodiments, the subset of the plurality of pin fingers corresponding to ground pins.

In some embodiments, the bridge card supports a first superset of signals via the edge connector and supports a second superset of signals via the socket connector. In such embodiments, the first superset of signals comprises the first set of signals and a third set of signals, and the second superset of signals comprises the second set of signals and the third set of signals. In various embodiments, the bridge card bridges the third set of signals between the edge connector and the socket connector.

In some embodiments, the bridge card comprises an amber LED and a blue LED. In such embodiments, the logic adapter may be configured to A) receive an electrical signal from a particular pin of the edge connector and B) convert the electrical signal into user information presentable to a user via the amber LED and the blue LED. In certain embodiments, the user information comprises failure information and location information.

In some embodiments, the bridge card comprises a green LED. In such embodiments, the logic adapter may be configured to A) receive an electrical signal from a particular pin of the edge connector, B) pass the electrical signal to a corresponding pin of the socket connector, and C) convert the electrical signal into state information presentable to a user via the green LED. In certain embodiments, the state information comprises a power state of the computer expansion card and host-initiated I/O activity state of the computer expansion card.

In some embodiments, the logic adapter comprises a serializer I/O expander configured to multiplex a plurality of digital inputs into a plurality of bits. In certain embodiments, the serializer I/O expander comprises a SGPIO interface. In certain embodiments, the plurality of digital inputs comprises a power loss indication signal and a power loss ACK signal.

According to a third aspect of the invention, a method may include engaging a computer expansion card with a first socket connector conforming with a first connector type and engaging an edge connector with a second socket connector conforming with a second connector type. The method includes transforming a first set of signals associated with the first connector type into a second set of signals associated with the second connector type.

In some embodiments, to transform the first set of signals into the second set of signals, the method includes multiplexing a plurality of digital inputs into a plurality of bits via a SGPIO interface. In such embodiments, the plurality of digital inputs includes a power loss indication signal and a power loss ACK signal. In some embodiments, the first connector type comprises an E1.S edge connector, and wherein the second connector type comprises an M.2 socket connector.

In some embodiments, the bridge card device supports a first superset of signals via the edge connector and supports a second superset of signals via the socket connector. In such embodiments, the first superset of signals comprises the first set of signals and a third set of signals, and the second superset of signals comprises the second set of signals and the third set of signals. In various embodiments, the method includes bridging the third set of signals between the edge connector and the socket connector.

In some embodiments, the bridge card device comprises an amber LED and a blue LED. In such embodiments, the method may include A) receiving an electrical signal from a particular pin of the edge connector and B) converting the electrical signal into user information presentable to a user via the amber LED and the blue LED. In certain embodiments, the user information comprises failure information and location information.

In some embodiments, the bridge card comprises a green LED. In such embodiments, the method may include A) receiving an electrical signal from a particular pin of the edge connector, B) passing the electrical signal to a corresponding pin of the socket connector, and C) converting the electrical signal into state information presentable to a user via the green LED. In certain embodiments, the state information comprises a power state of the computer expansion card and host-initiated I/O activity state of the computer expansion card.

FIG. 1 depicts an exemplary system 100 for emulating a specific type of computer expansion card, in accordance with aspects of the present disclosure. The system 100 includes is presented to show one example of an environment where an apparatus and method may be implemented in accordance with the embodiments of the disclosure. As depicted, the system 100 may include a computing device 101 comprising at least one processor 102, at least one memory device 104, at least one network adapter 106, at least one I/O controller 108, and at least one bridge card apparatus 110. In some embodiments, the computing device 101 may be an enterprise server and/or a server in a data center.

The processor(s) 102 may be operably connected to the memory device(s) 104. The memory device(s) 104 may include one or more non-volatile storage devices such as hard drives, solid state drives, CD-ROM drives, DVD-ROM drives, tape drives, or the like. The memory device(s) 104 may also include non-volatile memory such as a read-only memory (e.g., ROM, EPROM, EEPROM, and/or Flash ROM) or volatile memory such as a random access memory (e.g., RAM or operational memory). A computer bus, or plurality of buses, may interconnect the processor(s) 102, memory device(s) 104, the network adapter(s) 106, the I/O controller(s) 108, the bridge card apparatus(es) 110, and other devices to enable data and/or instructions to pass therebetween.

To enable communication with external systems or devices, the computing device 101 may include one or more I/O controllers 108. Such I/O controller(s) 108 may be embodied as wired ports (e.g., Universal Serial Bus ("USB") ports, serial ports, Firewire ports, Small Computer System Interface ("SCSI") ports, parallel ports, etc.) or wireless ports (e.g., BLUETOOTH®, Infrared Data Association® ("IrDA®"), etc.). The I/O controller(s) 108 may enable communication with one or more input devices (e.g., keyboards, mice, touchscreens, cameras, microphones, scanners, storage devices, etc.) and output devices (e.g., displays, monitors, speakers, printers, storage devices, etc.). The I/O controller(s) 108 may also enable communication with other computing devices 101.

In certain embodiments, the computing device 101 includes a wired or wireless network adapter 106 to connect the computing device 101 to a network 116, such as a LAN, WAN, or the Internet. Such a network 116 may enable the computing device 101 to connect to one or more servers, workstation, mobile computing devices, or other devices. Via the network 116, the computing device 101 may be interact with one or more communication client devices, such as a table computer 118a, a mobile phone 118b, a workstation or personal computer 118c, and/or laptop 118d (referred to collectively as "client devices" 118). While not depicted in FIG. 1, the system 100 may include—or be coupled to—various telecommunications equipment, such as email servers, communications servers, routers, switches, gateways, and other network elements and networking devices.

The system 100 is representative of various systems where the embodiments described herein may be deployed. The computing device 101, in some embodiments, is in a data center. In other embodiments, the computing device 101 is user-owned. While a single bridge card apparatus 110 (and expansion card 112) is depicted, one of skill in the art will recognize that multiple bridge card apparatuses 110 (i.e., each coupled to a respective expansion card 112) may be deployed on the computing devices 101.

In some embodiments, the computing device 101 may be a rack-mounted server, a workstation, a mainframe computer, a desktop server, a laptop server, and the like or any combination thereof. In such embodiments, the computing device 101 includes one or more processors, memory, data buses, access to non-volatile data storage, I/O connections, and the like. One of skill in the art will recognize other implementations of a computing device 101 comprising at least one bridge card apparatus 110 coupled to an expansion card 112.

The peer devices 118 are depicted as a tablet computer, a smartphone, a desktop computer, and a laptop computer as examples but may be implemented by a workstation, a terminal, or other computing device capable of connection to the computing device 101 over the network 116. In some embodiments, a peer device 118 is used by a system administrator for installation, maintenance, control, etc., of the bridge card apparatus 110 coupled to an expansion card 112. In other embodiments, the peer devices 118 are user devices for using the bridge card apparatus 110 coupled to an expansion card 112. For example, a user may use a smartphone as a peer device 118 to interact with the bridge card apparatus 110 coupled to an expansion card 112.

The network 116 connects the peer devices 118 to the computing device 101 to access the expansion card 112 coupled to the bridge card apparatus 110. The network 116 includes one or more networks. For example, the network 114 may include a LAN and may include a gateway to the Internet. The network 116 network may include cabling, optical fiber, etc. and may also include a wireless connection and may include a combination of network types. The network 116 may include a LAN, a WAN, a storage area network ("SAN"), an optical fiber network, etc. Various computer networks that are part of the depicted network 116 may be private and/or public, for example, through an Internet Service Provider.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standards. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the IrDA®. Alternatively, the wireless connection may be a cellular telephone network communication. All standards and/or connection types include the latest version and revision of the standard and/or connection type as of the filing date of this application.

In various embodiments, the expansion card 112 comprises a solid state storage device. The bridge card apparatus 110 provides physical connectors, electrical interfaces, and signal adaptation to allow the expansion card 112 to emulate a different type of storage device. The bridge card apparatus 110 and expansion card 112 may be located within a common enclosure 114. As described herein, the expansion card 112 may conform to the M.2 specifications, while the bridge card apparatus 110 provides a connector and interface compatible with the E1.S specifications. Moreover, the bridge card apparatus 110 provides signal adaptation (also referred to as signal blending) to allow the expansion card 112 (e.g., a M.2 module) to emulate an E1.S drive. While the expansion card 112 and bridge card apparatus 110 are described primarily with reference to the M.2 and E1.S specifications, one of skill in the art will recognize other expansion card (e.g., storage drive) specifications that can be adapted and emulated using the bridge card apparatus 110 coupled to an expansion card 112.

In various embodiments, the bridge card apparatus 110 includes an edge connector for coupling the bridge card apparatus 110 to the computing device 101. Here, the edge connector may extend through the enclosure 114 to insert into a slot or socket connector of the computing device 101. In various embodiments, the edge connector conforms with the E1.S specifications, having the proper physical dimensions, mechanical connectors, and electrical interfaces to couple to an E1.S slot or socket connector. The edge connector is described in greater detail below.

The bridge card apparatus 110 includes a socket connector for receiving the expansion card 112. In various embodiments, the socket connector conforms with the M.2 specifications, having the proper physical dimensions, mechanical connectors, and electrical interfaces to couple to an M.2 edge connector of the expansion card 112. The socket connector is described in greater detail below.

The bridge card apparatus 110 includes a way to bridge signaling between the E1.S host (i.e., the computing device 101) and the M.2 device (i.e., the expansion card 112). In one embodiment, the bridge card apparatus 110 includes a logic adapter that adapts signals unique to the E1.S connector into signals recognized by the M.2 device, and adapts signals unique to the M.2 connector into signals recognized by the E1.S host. Moreover, the bridge card apparatus 110 may pass through signals common to the E1.S and M.2 connectors. The bridge card apparatus 110 is described in more detail below in relation to FIGS. 2 through 6.

Figure 2:
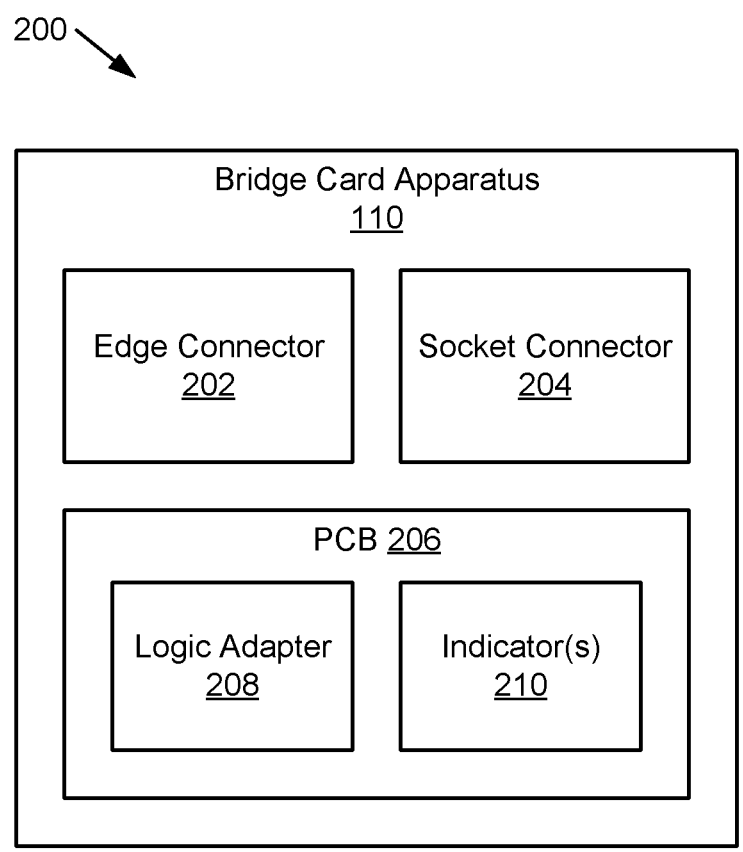
FIG. 2 is a block diagram illustrating one embodiment of a bridge card apparatus that supports techniques for emulating a computer expansion card in accordance with aspects of the present disclosure.

FIG. 2 depicts an exemplary apparatus 200 for emulating a specific type of computer expansion card, in accordance with aspects of the present disclosure. The apparatus 200 includes one embodiment of the bridge card apparatus 110 that includes an edge connector 202, a socket connector 204, and a PCB 206 including at least a logic adapter 208 and one or more indicators 210, which are described below.

The apparatus 200 includes an edge connector 202 configured to be inserted into a host device. The edge connector 202 includes a multiple pin fingers (also referred to as signal pins). In certain embodiments, the pin fingers may comprise gold fingers, e.g., conductive pins made of or plated with gold. In some embodiments, the multiple pin fingers include a set of ground pins. To support hot swapping, the set of ground pins may have an extended finger length compared to the remainder of the pin fingers.

In various embodiments, the edge connector 202 is an E1.S edge connector complying with EDSFF specifications for E1.S electrical and mechanical interfaces, e.g., complying with SFF-TA-1006. In one embodiment, the edge connector 202 has a 2C connector size as defined in EDSFF specification. Here, the edge connector 202 may include a notch separating a first set of pin fingers from the remainder of the pin fingers. In another embodiment, the edge connector 202 has a 1C connector size as defined in EDSFF specifications.

The apparatus 200 includes a socket connector 204 configured to couple with an expansion card 112, such as a solid state storage device complying with the M.2 standards. As such, the socket connector may comprise a slot for receiving the expansion card 112. In certain embodiments, the socket connector 204 may include various pins providing an electrical interface with the expansion card 112.

In various embodiments, the socket connector 204 is a M.2 socket complying with PCI-SIG specification for M.2 mechanical and electrical interfaces. In one embodiment, the socket connector 204 is a keyed socket having a Socket 3, Key-M size.

The apparatus 200 includes a logic adapter 208 configured to convert a first set of signals associated with the first connector type into a second set of signals associated with the second connector type. The logic adapter 208 is described in more detail below in relation to FIG. 4.

As described above, the logic adapter 208 is configured to adapt signals unique to an interface of the edge connector 202 into signals recognizable by the expansion card 112. For example, the logic adapter 208 may adapt E1.S signals into signals recognizable by an M.2 device. Additionally, the logic adapter 208 is configured to adapt signals unique to an interface of the socket connector 204 into signals recognizable by the host system, such as the computing device 101. For example, the logic adapter 208 may adapt M.2 signals into signals recognized by an E1.S host.

In further embodiments, the PCB 206 may be configured to pass through various signals common to the edge connector 202 and socket connector 204. For example, common signaling between an E1.S edge connector and a M.2 socket connector may include Peripheral Component Interconnect Express ("PCIe") transmit and receive signals, clock signals, sideband signaling, and the like.

Accordingly, the PCB 206 may support a superset of signals comprising a first set of signals unique to the edge connector 202 and not common to the socket connector 204, a second set of signals unique to the socket connector 204 and not common to the edge connector 202, and a third set of signals common to the edge connector 202 and socket connector 204. In such embodiments, the PCB 206 may bridge the third set of signals between the edge connector 202 and the socket connector 204, while the logic adapter 208 may transform the first set of signals (e.g., E1.S-specific signaling) into the second set of signals (e.g., M.2-specific signaling) and/or transform the second set of signals into the first set of signals. Signal blending is described in greater detail below with reference to FIGS. 4 and 6.

The apparatus 200 includes one or more indicators 210 configured to signal information to a user. In some embodiments, the one or more indicators 210 includes an amber LED and a blue LED. In one embodiment, the apparatus 200 includes a combined function LED capable of outputting both amber and blue light. In another embodiment, the apparatus 200 includes discrete amber and blue LEDs. In the following descriptions, the notation "amber/blue LED" is used with reference to the amber and blue LEDs, which may be discrete component or a combined function component.

In various embodiments, the logic adapter 208 may receive an electrical signal from a particular pin of the edge connector 202 and then convert the electrical signal into user information presentable to a user via the amber/blue LED. In certain embodiments, the user information comprises failure information and location information.

In some embodiments, the one or more indicators 210 includes a green LED. In various embodiments, the logic adapter 208 is configured to receive an electrical signal from a particular pin of the edge connector 202, to pass the electrical signal to a corresponding pin of the socket connector 204, and to convert the electrical signal into state information presentable to a user via the green LED. In certain embodiments, the state information comprises a power state of the expansion card 112 (e.g., M.2 module) and host-initiated I/O activity state of the expansion card 112.

Note that the blocks 202-210 represent functional blocks of the apparatus 200 and may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, interfaces, adapters, or any other components. The description of the functionality provided by the different components 202, 204, 206, 208 and/or 210 described below is for illustrative purposes, and is not intended to be limiting, as any of components 202, 204, 206, 208 and/or 210 may provide more or less functionality than is described. For example, one or more of components 202, 204, 206, 208 and/or 210 may be eliminated, and some or all of its functionality may be provided by other ones of components 202, 204, 206, 208 and/or 210. As another example, the apparatus 200 may comprise additional components that may perform some or all of the functionality attributed above to one or more of the components 202, 204, 206, 208 and/or 210.

Figure 3:
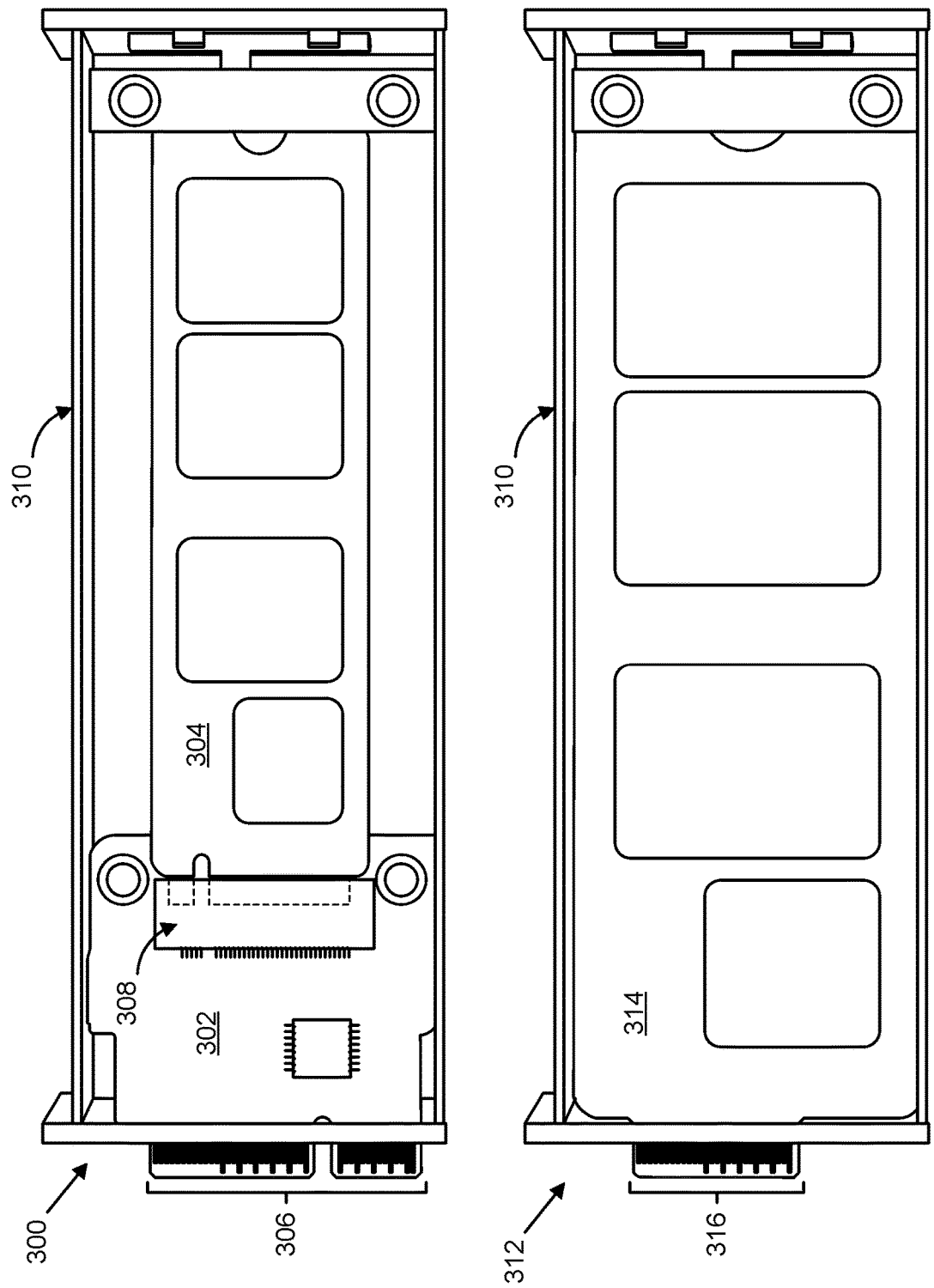
FIG. 3 is a block diagram illustrating an E1.S emulation using a bridge card adapter and an M.2 module in accordance with aspects of the present disclosure.

FIG. 3 depicts an embodiment of an emulation device 300 for emulating a E1.S device, in accordance with aspects of the present disclosure. The emulation device 300 includes a bridge PCB card 302 coupled to an M.2 module 304. The bridge PCB card 302 includes an edge connector 306 and a slot connector 308. The bridge PCB card 302 and M.2 module 304 are housed inside an enclosure 310.

The edge connector 306 may be one embodiment of the edge connector 202. In various embodiments, the edge connector 306 emulates an E1.S edge connector complying with the EDSFF specification for mechanical and electrical interfaces. As depicted, the edge connector 306 has a subset of longer pins which correspond to the ground pins for the bridge PCB card 302.

The slot connector 308 is configured to receive the M.2 module 304. The slot connector 308 may be one embodiment of the socket connector 204. In various embodiments, the socket connector 504 is a M.2 connector complying with the PCI-SIG specification for mechanical and electrical interfaces. The socket connector 504 is coupled to the edge connector 502. In various embodiments, the bridge PCB card bridges and adapts signals between the edge connector 306 and the slot connector 308, as described herein.

The M.2 module 304 may be one embodiment of the memory expansion card 112, as described above. In the various embodiments, the M.2 module 304 comprises a NVME controller and NVME storage media. The combination of the bridge PCB card 302 and the M.2 module 304 fit inside the E1.S enclosure space.

Note that FIG. 3 further depicts an E1.S drive 312 comprising an E1.S module 314 having an E1.S edge connected 316. In various embodiments, the enclosure 310 is capable of housing an E1.S module 322 or a M.2 module 304 coupled to a bridge PCB card 302.

Figure 4:
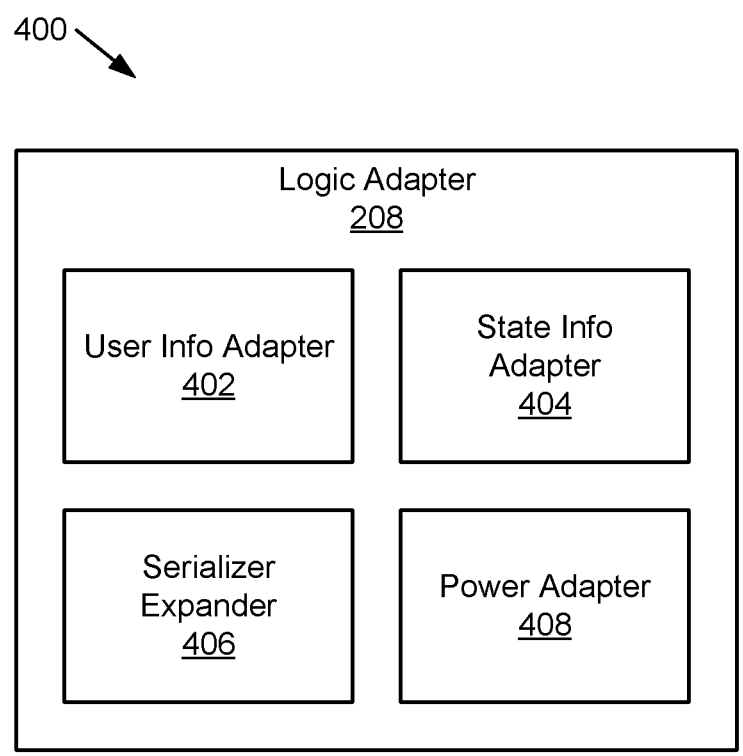
FIG. 4 is a block diagram illustrating one embodiment of a logic adapter that supports techniques for emulating a computer expansion card in accordance with aspects of the present disclosure.

FIG. 4 illustrates an exemplary apparatus 400 for converting a first set of signals associated with the first connector type into a second set of signals associated with the second connector type, in accordance with aspects of the present disclosure. The apparatus 400 includes one embodiment of the logic adapter 208 that includes a user information adapter 402, a state information adapter 404, a serializer expander 406, and a power adapter 408, which are described below.

The apparatus 400 includes a user information adapter 402 configured to convert an electrical signal received at an edge connector pin finger into user information presentable to a user. In certain embodiments, the user information comprises failure information and location information. As described above, the user information may be presented to the user via an amber/blue LED.

The apparatus 400 includes a state information adapter 404 configured to convert an electrical signal received at a socket connector pin into state information presentable to a user via the green LED. In certain embodiments, the state information comprises a power state of the expansion card 112 (e.g., M.2 module) and host-initiated I/O activity state of the expansion card 112.

The apparatus 400 includes a serializer expander 406 configured to multiplex a plurality of digital inputs into a plurality of bits. For example, a first digital input may be a power loss indication signal and a second digital input may be a power loss ACK signal. In various embodiments, the serializer expander 406 may be implemented by a SGPIO expander.

The apparatus 400 includes a power adapter 408 configured to provide signals at different voltages at the edge connector (e.g., edge connector 202) and socket connector (e.g., socket connector 204). In such embodiments, the power adapter may be coupled to the user information adapter 402, the state information adapter 404, and/or the serializer expander 406, so as to control signal voltages when adapting signals between the edge connector and socket connector.

Note that the blocks 402-408 represent functional blocks of the apparatus 400 and may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, interfaces, adapters, or any other components. The description of the functionality provided by the different components 402, 404, 406, and/or 408 described below is for illustrative purposes, and is not intended to be limiting, as any of components 402, 404, 406, and/or 408 may provide more or less functionality than is described. For example, one or more of components 402, 404, 406, and/or 408 may be eliminated, and some or all of its functionality may be provided by other ones of components 402, 404, 406, and/or 408. As another example, the apparatus 400 may comprise additional components that may perform some or all of the functionality attributed below to one or more of the components 402, 404, 406, and/or 408.

Figure 5A:
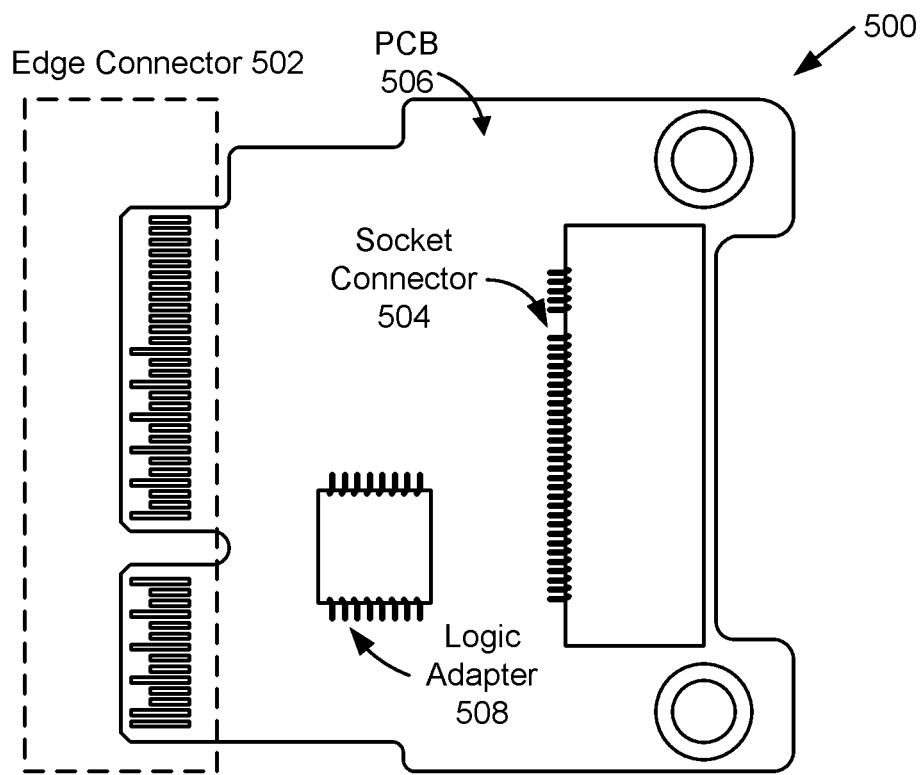
FIG. 5A is a diagram illustrating one embodiment of a bridge PCB card that supports techniques for emulating a computer expansion card in accordance with aspects of the present disclosure.
Figure 5B:
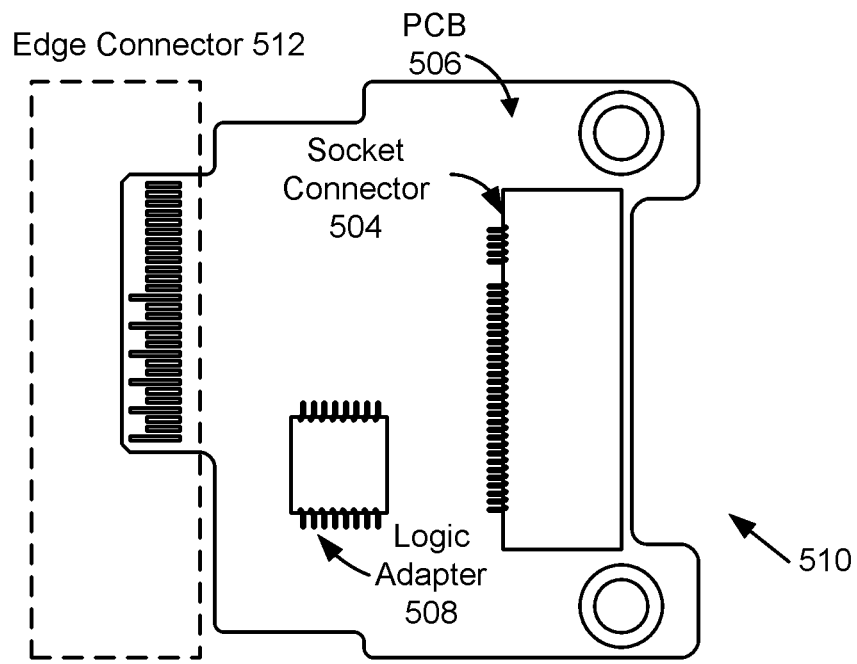
FIG. 5B is a diagram illustrating another embodiment of a bridge PCB card that supports techniques for emulating a computer expansion card in accordance with aspects of the present disclosure.

FIGS. 5A-5B depict examples of a bridge card, in accordance with aspects of the present disclosure. FIG. 5A illustrates a first example of a bridge card 500 having an edge connector 502, a socket connector 504, a PCB 506, and a logic adapter 508. The bridge card 500 may be one embodiment of the bridge card apparatus 110, the apparatus 200, and/or the bridge PCB card 302. In various embodiments, the bridge card 500 has a physical outline that enables it to fit inside an E1.S enclosure, such as the enclosure 310.

The edge connector 502 may be one embodiment of the edge connector 202 and/or the edge connector 306. In various embodiments, the edge connector 502 emulates an E1.S edge connector, e.g., as defined in EDSFF specification. In the depicted embodiment, the edge connector 502 uses the larger 2C version of the EDSFF connector for extra signal pins. As depicted, the edge connector 502 includes two edge fingers, each having a set of signal pins. In each set of signal pins, there is a subset of longer pins which correspond to the ground pins for the edge connector 502.

The socket connector 504 may be one embodiment of the socket connector 204 and/or the slot connector 308. In various embodiments, the socket connector 504 is a M.2 connector configured to receive an M.2 module. The socket connector 504 is coupled to the edge connector 502 and to the logic adapter 508.

The PCB 506 hosts the edge connector 502, the socket connector 504, and the logic adapter 508. The PCB 506 includes signal traces coupling the edge connector 502, the socket connector, and to the logic adapter 508. As described herein, the signal blending is performed by the bridge card 500 so that an M.2 module coupled to the bridge card 500 emulates an E1.S module. In some embodiments, the PCB 506 bridges common signaling between the M.2 module and the E1.S host. In some embodiments, the logic adapter 508 creates new E1.S signals towards the E1.S host and/or creates new M.2 signals towards the M.2 module.

FIG. 5B illustrates a first example of a bridge card 510 having an edge connector 512, the socket connector 504, the PCB 506, and the logic adapter 508. The bridge card 510 may be one embodiment of the bridge card apparatus 110, the apparatus 200, and/or the bridge PCB card 302. In various embodiments, the bridge card 510 has a physical outline that enables it to fit inside an E1.S enclosure, such as the enclosure 310.

The edge connector 512 may be one embodiment of the edge connector 202 and/or the edge connector 306. In various embodiments, the edge connector 502 emulates an E1.S edge connector, e.g., as defined in EDSFF specification. In the depicted embodiment, the edge connector 512 uses the smaller 1C version of the EDSFF connector. As depicted, there is a subset of longer pins which correspond to the ground pins for the edge connector 502. Because the edge connector 512 has fewer pins as compared to the edge connector 502, in one embodiment the logic adapter 508 does not convert certain M.2 signals into E1.S signaling.

Figure 6:
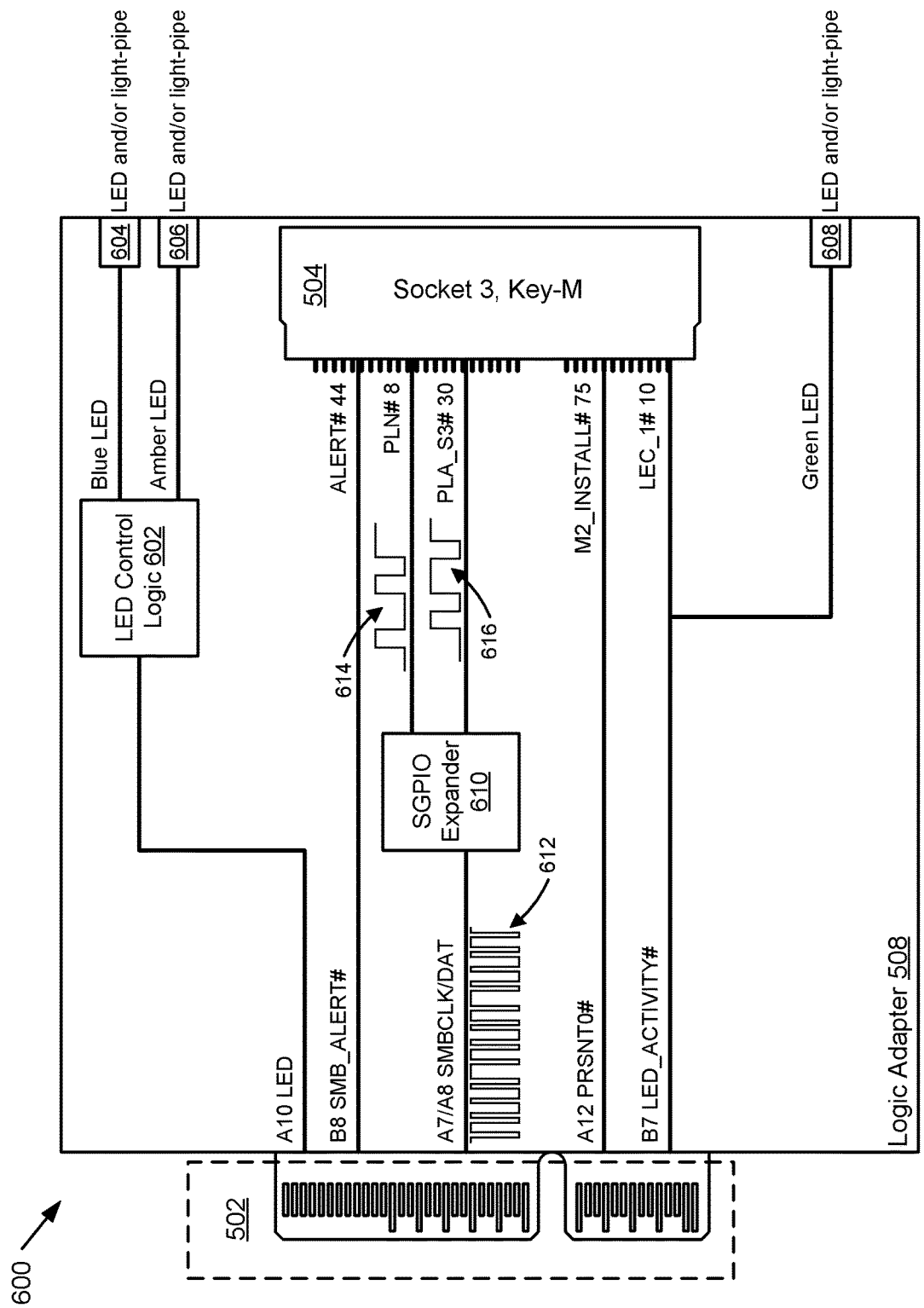
FIG. 6 is a diagram illustrating one embodiment of a bridge PCB card that supports techniques for emulating a computer expansion card in accordance with aspects of the present disclosure.

FIG. 6 depicts an exemplary scenario 600 of signal blending at a bridge card, such as the bridge card 500, in accordance with aspects of the present disclosure. In the scenario 600, it is assumed that an edge connector 502 is coupled to an E1.S slot connector of a host system (such as the computing device 101, an enterprise server, a server in a datacenter, etc.) and the socket connector 504 is coupled to an M.2 module (such as the M.2 module 304). In one embodiment, the edge connector 502 is a notched connector having a 2C size, and the socket connector 204 is a keyed socket having a Socket 3, Key-M size.

In various embodiments, the logic adapter 508 is configured to transform the first set of signals (e.g., E1.S-specific signaling) into the second set of signals (e.g., M.2-specific signaling) and/or transform the second set of signals into the first set of signals. In certain embodiments, the logic adapter 508 is configured to pass through a set of common signals. The E1.S pinout and signals are defined in EDSFF specification SFF-TA-1009. While not depicted in FIG. 6, the logic adapter 508 may contain—or be coupled to—a power converter to adapt signal voltages between the edge connector 502 and the socket connector 504.

The logic adapter 508 includes an LED control logic circuitry 602 connectively coupled to at least one pin of the edge connector 502. In the depicted embodiment, the LED control logic circuitry 602 is coupled to the A10 pin of the E1.S connector which is used to transmit/receive an LED signal. Additionally, the LED control logic circuitry 602 is connectively coupled to a blue LED 604 and to an amber LED 606. As mentioned above, in certain embodiments, the blue and amber LED are discrete components, while in other embodiments these may be a combined function component.

Based on the signal on the A10 pin, the LED control logic circuitry 602 generates a blue LED signal and/or an amber LED signal. The blue LED signal is output to the blue LED 604 and the amber LED signal is output to the amber LED 606. Note that the A10 signal on the E1.S edge connector is typically routed directly to an E1.S drive. To emulate the E1.S drive, the bridge card 500 includes this LED control logic circuitry 602.

In some embodiments, the blue LED 604 and the amber LED 606 are used to signal user information, such as failure information and/or location information. In certain embodiments, the LED source control is the backplane, e.g., of the host system. In other embodiments, the LED source control is the emulated E1.S module (e.g., the bridge card 500 coupled to the M.2 module). Note that the functionality of the blue LED 604 and the amber LED signal 606 is host defined and not defined by EDSFF.

The logic adapter 508 includes a wiring addition that connectively couples a pin of the edge connector 502 to a corresponding pin of the socket connector 504. In the depicted embodiment, the wiring addition couples the B7 pin of the E1.S connector (which is reserved in EDSFF specification for optional device manufacturing purposes) to the 10 pin of the M.2 connector. Additionally, the wiring addition couples these pins to a green LED 608.

Based on the signal (i.e., LED_1 #signal) on the 10 pin, the green LED 608 is activated or deactivated to state and/or activity information of the solid state storage device (i.e., the M.2 module). In certain embodiments, the green LED 608 is used to signal a power state of the M.2 module and/or a M.2 presence detection state. In some embodiments, the green LED 608 may be used to signal an I/O activity state of the M.2 module. In certain embodiments, the LED activity signal passed to the host system via the B7 pin (which is otherwise unused to conventional E1.S devices).

In some embodiments, blue LED 604, the amber LED 606, and/or the green LED 608 may be located on the PCB of the bridge card 500 and are 'light piped' to a front surface of the enclosure box (e.g., the enclosure 114 and/or enclosure 310) to be viewed by the user from the front of the host system. In one embodiment, the light pipe may be a clear plastic part (e.g., a rigid part). In another embodiment, the light pipe may be a fiber optic cable (e.g., a flexible part). In other embodiments, the blue LED 604, the amber LED 606, and/or the green LED 608 may be located on the front surface of the enclosure box, wherein the logic adapter 508 is communicatively coupled to the LEDs 604, 606, and/or 608.

The logic adapter 508 includes a serializer I/O expander—here the SGPIO expander 610—coupled to an Inter-Integrated Circuit ("I2C") bus for additional sideband control. The serializer I/O expander is used to bridge certain M.2-specific functions where there are no unused signal pins available on the E1.S connector (e.g., the 2C connector). In various embodiments, the SGPIO expander 610 senses and records digital inputs (e.g., from the right side of the expander block). A System Management Bus ("SMBus") controller at the host system reads the SGPIO expander 610 to retrieve digital input bits 612.

Note that a SGPIO expander is conventionally used for static and/or ad hoc data bit inputs. However, in accordance with aspects of the present disclosure, when the SMBus controller reads the SGPIO expander 610 at a regular rate, this becomes a digital sampling over the serial I2C/SMBus of the digital input bits. In one embodiment, the number of digital input bits can be eight bits. In one example, the Power Loss Indication ("PLN") signal 614 from M.2 pin 8 is sensed and recorded by the SGPIO expander 610. In another example, the Power Loss ACK ("PLA") signal 616 from M.2 pin 30 is sensed and recorded by the SGPIO expander 610. In the depicted embodiment, the SGPIO expander 610 is coupled to the E1.S pin A7 and/or pin A8 (which pins are currently used for sideband signaling of SMBus clock ("SMBCLK") and SMBus data ("SMBDATA") signals).

While FIG. 6 depicts the edge connector 502 having a 2C size, in other embodiments the logic adapter 508 may be coupled to a 1C sized edge connector, such as the edge connector 512. In such embodiments, the SGPIO expander 610 may sense and record additional signal pins to generate additional digital input bits readable by the SMBus controller, as compared to the case of the 2C sized edge connector.

As depicted, the logic adapter 508 may bridge additional signal pins between the M.2 module and the E1.S host. For example, the logic adapter 508 may bridge the E1.S pin B8 with the M.2 pin 44. Here, the logic adapter may adapt a M.2 sideband Alert signal to a SMBus Alert signal on the E1.S pin B8 (which pin is currently reserved for future sideband signaling use). As another example, the logic adapter 508 may bridge the E1.S pin A12 with the M.2 pin 75. Here, the logic adapter may adapt a E1.S sideband Presence signal to a M.2 Install signal on the M.2 pin 75 (which pin is currently used for a host signal ground or GND).

Figure 7:
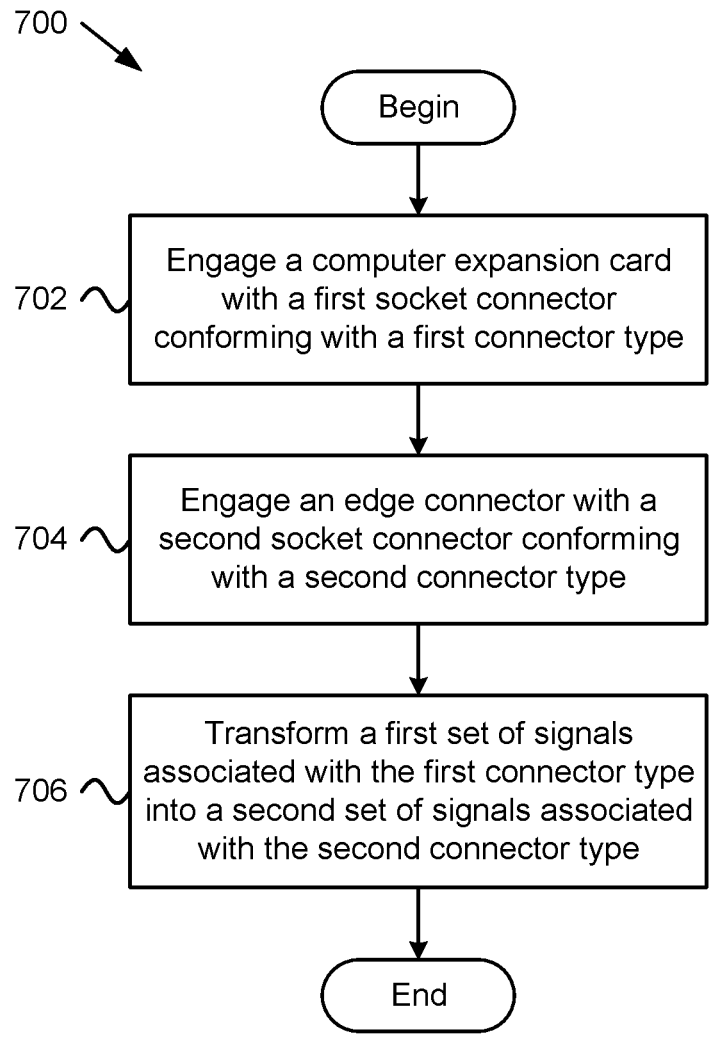
FIG. 7 is a flow chart diagram illustrating one embodiment of a representative method for emulating a computer expansion card in accordance with aspects of the present disclosure.

FIG. 7 depicts an exemplary method 700 for collating and selectively presenting communications, in accordance with aspects of the present disclosure. In various embodiments, the method 700 is performed by a bridge card, such as the computing device 101, the bridge card apparatus 110, the apparatus 200, the bridge PCB card 302, the apparatus 400, the bridge card 500, and/or the bridge card 510, as described above. In some embodiments, all or a portion of the method 700 is performed by a processor, such as a microcontroller, a microprocessor, a Central Processing Unit ("CPU"), a Graphics Processing Unit ("GPU"), an auxiliary processing unit, a FPGA, or the like.

The method 700 begins and engages 702 a computer expansion card with a first socket connector conforming with a first connector type. In some embodiments, the first connector type comprises an E1.S edge connector.

The method 700 includes engaging 704 an edge connector with a second socket connector conforming with a second connector type. In some embodiments, the second connector type comprises an M.2 socket connector.

The method 700 includes transforming 706 a first set of signals associated with the first connector type into a second set of signals associated with the second connector type. In some embodiments, to transform 706 the first set of signals into the second set of signals, the first method includes multiplexing a plurality of digital inputs into a plurality of bits via a SGPIO interface. In certain embodiments, the plurality of digital inputs includes a power loss indication signal and a power loss acknowledgement signal. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an edge connector comprising a plurality of pin fingers, the edge connector conforming with a first connector type;
   a socket connector configured to receive a computer expansion card conforming with a second connector type; and
   a printed circuit board ("PCB") comprising a logic adapter configured to convert a first set of signals associated with the first connector type into a second set of signals associated with the second connector type, wherein the logic adapter comprises a serializer input/output expander configured to multiplex a plurality of digital inputs into a plurality of bits.

2. The apparatus of claim 1, wherein the first connector type comprises an E1.S edge connector, and wherein the second connector type comprises an M.2 socket connector.

3. The apparatus of claim 1, wherein the edge connector has a 2C connector size, and wherein the edge connector comprises a notch separating a first set of the plurality of pin fingers from a remainder of the plurality of pin fingers.

4. The apparatus of claim 1, wherein a subset of the plurality of pin fingers corresponding to ground pins comprises an extended finger length compared to a remainder of the plurality of pin fingers.

5. The apparatus of claim 1, wherein the PCB supports a first superset of signals via the edge connector and supports a second superset of signals via the socket connector, wherein the first superset of signals comprises the first set of signals and a third set of signals, wherein the second superset of signals comprises the second set of signals and the third set of signals, and wherein the PCB is configured to bridge the third set of signals between the edge connector and the socket connector.

6. The apparatus of claim 1, wherein the PCB comprises an amber light emitting diode ("LED") and a blue LED, and wherein the logic adapter is configured to receive an electrical signal from a particular pin of the edge connector and to convert the electrical signal into user information presentable to a user via the amber LED and the blue LED.

7. The apparatus of claim 1, wherein the PCB comprises a green light emitting diode ("LED"), and wherein the logic adapter is configured to receive an electrical signal from a particular pin of the edge connector, to pass the electrical signal to a corresponding pin of the socket connector, and to convert the electrical signal into user information presentable to a user via the green LED.

8. The apparatus of claim 1, wherein the serializer input/output expander comprises a serial general purpose input/output ("SGPIO") interface.

9. The apparatus of claim 1, wherein the plurality of digital inputs comprises a power loss indication signal and a power loss acknowledgement signal.

10. A system comprising:
    an enclosure dimensioned to conform to a first form factor;
    a computer expansion card located within the enclosure; and
    a bridge card coupled to the computer expansion card and located within the enclosure, the bridge card comprising:
      an edge connector comprising a plurality of pin fingers, the edge connector conforming with a first connector type;
      a socket connector configured to receive the computer expansion card, the socket connector conforming with a second connector type; and
      a printed circuit board ("PCB") comprising a logic adapter configured to convert a first set of signals associated with the first connector type into a second set of signals associated with the second connector type, wherein the logic adapter comprises a serializer input/output expander configured to multiplex a plurality of digital inputs into a plurality of bits.

11. The system of claim 10, wherein the first form factor comprises an E1.S form factor, wherein the first connector type comprises an E1.S edge connector, and wherein the second connector type comprises an M.2 socket connector.

12. The system of claim 10, wherein the edge connector has a 2C connector size, wherein the edge connector comprises a notch separating a first set of the plurality of pin fingers from a remainder of the plurality of pin fingers, and wherein a subset of the plurality of pin fingers corresponding to ground pins comprises an extended finger length compared to the remainder of the plurality of pin fingers.

13. The system of claim 10, wherein the bridge card supports a first superset of signals via the edge connector and supports a second superset of signals via the socket connector, wherein the first superset of signals comprises the first set of signals and a third set of signals, wherein the second superset of signals comprises the second set of signals and the third set of signals, and wherein the PCB is configured to bridge the third set of signals between the edge connector and the socket connector.

14. The system of claim 10, wherein the bridge card comprises an amber light emitting diode ("LED"), a blue LED, and a green LED, wherein the logic adapter is configured to:
    receive a first electrical signal from a first pin of the edge connector,
    convert the first electrical signal into user information presentable to a user via the amber LED and the blue LED,
    receive a second electrical signal from a second pin of the edge connector,
    pass the second electrical signal to a corresponding pin of the socket connector, and
    convert the second electrical signal into state information presentable to the user via the green LED.

15. The system of claim 10, wherein the serializer input/output expander comprises a serial general purpose input/output ("SGPIO") interface, and wherein the plurality of digital inputs comprises a power loss indication signal and a power loss acknowledgement signal.

16. A method of a bridge card, the method comprising:
    engaging a computer expansion card with a first socket connector conforming with a first connector type;
    engaging an edge connector with a second socket connector conforming with a second connector type; and
    transforming a first set of signals associated with the first connector type into a second set of signals associated with the second connector type, wherein transforming the first set of signals into the second set of signals comprises multiplexing a plurality of digital inputs into a plurality of bits via a serializer input/output expander.

17. The method of claim 16, wherein the serializer input/output expander comprises a serial general purpose input/output ("SGPIO") interface, wherein the plurality of digital inputs comprises a power loss indication signal and a power loss acknowledgement signal.

18. The method of claim 16, wherein the first connector type comprises an E1.S edge connector, and wherein the second connector type comprises an M.2 socket connector.

19. The method of claim 16, further comprising:
- supporting a first superset of signals via the first socket connector, wherein the first superset of signals comprises the first set of signals and a third set of signals;
- supporting a second superset of signals via the second socket connector, wherein the second superset of signals comprises the second set of signals and the third set of signals; and
- bridging the third set of signals between the first socket connector and the second socket connector.

20. The method of claim 16, wherein the bridge card comprises an amber light emitting diode ("LED"), a blue LED, and a green LED, wherein transforming the first set of signals associated with the first connector type into the second set of signals associated with the second connector type comprises:
- receiving a first electrical signal from a first pin of the first socket connector;
- converting the electrical signal into user information presentable to a user via the amber LED and the blue LED;
- receiving an electrical signal from a second pin of the first socket connector;
- passing the electrical signal to a corresponding pin of the socket connector, and
- converting the electrical signal into state information presentable to the user via the green LED.

* * * * *